March 8, 1938.  A. EICHENGRUN  2,110,570
MOLDING APPARATUS
Original Filed Sept. 30, 1927    2 Sheets-Sheet 1
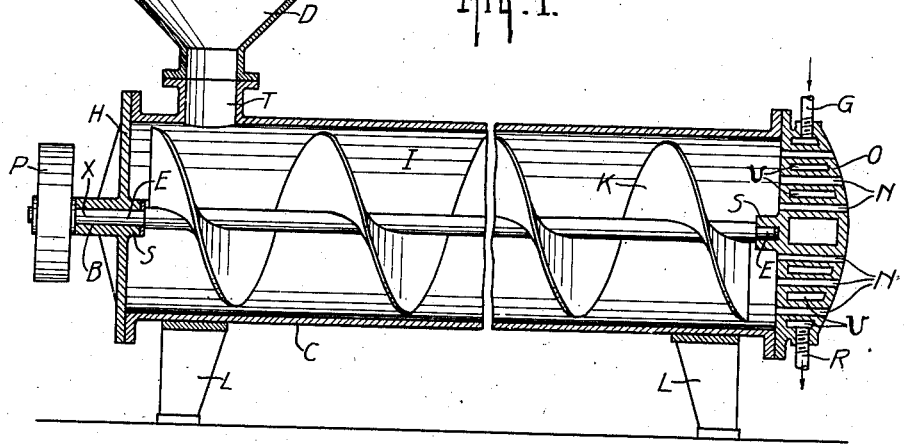
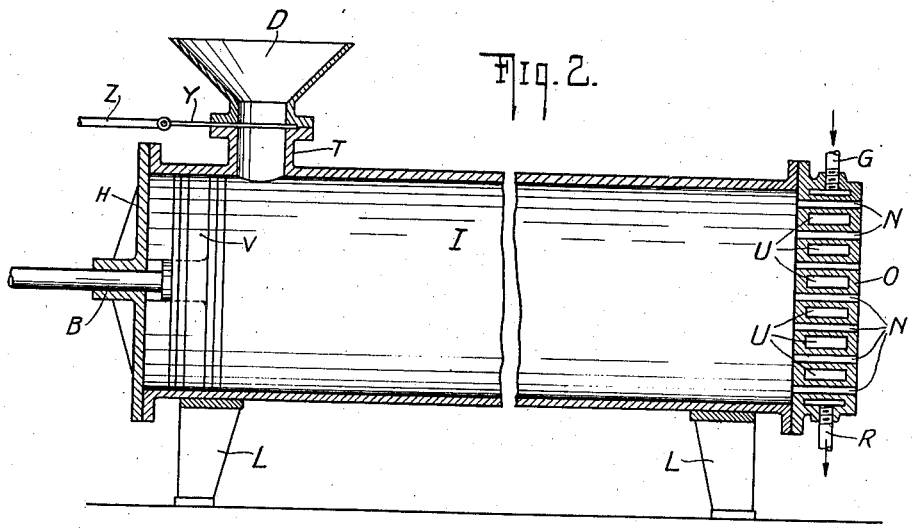
Inventor
ARTHUR EICHENGRUN
By  J. Seltzer and B. W. Levinson
Attorneys March 8, 1938.　　　A. EICHENGRUN　　　2,110,570
MOLDING APPARATUS
Original Filed Sept. 30, 1927　　2 Sheets-Sheet 2
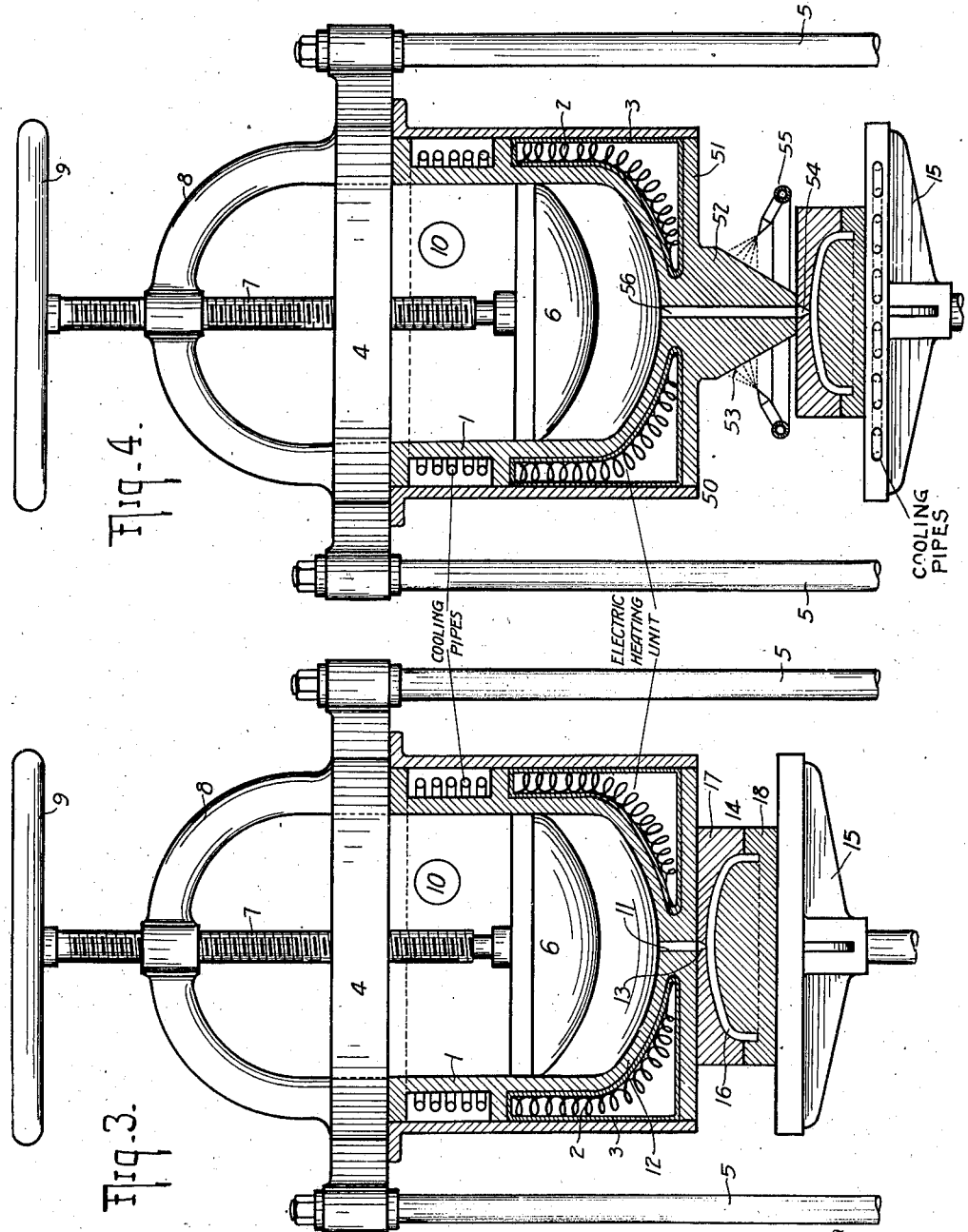
Inventor
ARTHUR EICHENGRUN
By　I. Seltzer and L.W. Levinson
Attorneys Patented Mar. 8, 1938

2,110,570

UNITED STATES PATENT OFFICE 2,110,570

MOLDING APPARATUS

Arthur Eichengrün, Charlottenburg, Germany, assignor to Celanese Corporation of America, a corporation of Delaware Original application September 30, 1927, Serial No. 223,121. Divided and this application May 20, 1931, Serial No. 538,719. In Germany May 20, 1927

2 Claims. (Cl. 18—12)

This invention relates to pressed masses, and more particularly relates to pressed masses and a process for the production of such masses from compounds of cellulose, to a friable intermediate material for pressed masses and a process for the manufacture thereof, to apparatus used in the aforesaid process, and to a die casting process for extrudable and moldable cellulosic materials.

This application is a division of my application No. 223,121 filed Sept. 30, 1927.

Heretofore there have been two general processes employed in the production of pressed masses. One process, as is well known, involved mechanical working of a raw material, such as a compound of cellulose, an extensive and complicated intermediate treatment preliminary to pressing, and a final operation of pressing the intermediate material into a finished product. In the case of nitrocellulose or cellulose acetate, for example, a plastic mass was formed by an intensive mechanical working of a mixture of nitrocellulose or cellulose acetate, camphor or camphor substitutes, and volatile solvents in order to effect jellification of the mass. The jellified mass produced in the aforesaid manner was then pressed or rolled into plates, blocks, etc. which had to be subjected to a prolonged drying process so as to cause a gradual evaporation of the solvents. This process, as is well known, had many disadvantages, the more serious ones being the expensive and complicated factory required to produce the finished product, the long drying period needed particularly for large articles, the inability of the finished products to resist high temperatures and high dielectric stresses, the impossibility of making large molded artcles, especially articles with thick walls, and the inability to produce articles other than small flat thin objects or hollow thin-walled bodies.

A process which was superior to the aforesaid process and which produced molded articles of limited sizes, involved the production of pressed masses directly from compounds of cellulose (especially cellulose acetate) entirely without or with such a limited amount of a solvent that the cellulose or celluloid will not be dissolved and will not be formed into a plastic paste, by first subjecting the cellulose compound, preferably in the presence of a filling material to the simultaneous application of high heat and heavy pressure and subsequent cooling under pressure to cause the formation of a hard stone-like block of material, then mechanically grinding or disintegrating the aforesaid block of material to a powder and then subjecting the powder with or without the addition of more filling material to the simultaneous application of heat and pressure in a mold having the shape of the finished product and finally cooling the mold under pressure to produce a pressed article. This process although far better than the first mentioned process is open to objection that the primary pressing requires high heat and heavy pressure and that the intermediate material either in the form of blocks, rods, ribbons, filaments, or the like requires mechanical disintegration in order to convert the material into a condition wherein it will be suitable for the final molding or pressing procedure. In the primary pressing operation and in the disintegration operation costly and heavy machinery are needed and complicated steps are involved. Moreover, due to the fact that heavy pressure and high temperature are required in the primary pressing operation, only small quantities, in general a few pounds, could be made at one time. Furthermore, in the final pressing operation it was necessary to keep the mold under pressure until it was cold, so that the productive capacity was low and the amount of equipment needed in a factory was large.

The present invention is directed primarily to the latter process to overcome the disadvantages noted heretofore, and in addition, to provide advantages which will be more fully pointed out hereinafter.

I have discovered that when compounds of cellulose are subjected in the condition of a doughy mass to heat treatment, preferably localized heat, according to my invention, and passed preferably from a relatively restricted area into free space, I obtain a friable product which disintegrates upon touching and crumbles in one's hand, and which is light and fluffy in texture and easily worked. By utilizing my invention for the production of pressed masses, I effect great economy, eliminate complicated and troublesome operations and apparatus heretofore necessary, facilitate and simplify the manufacture, increase the productive capacity of a given plant and in general improve the entire process.

Generally speaking, my invention consists in making a doughy mass of material containing cellulose derivatives and then causing the doughy mass to pass through a restricted area, preferably, with the simultaneous application of localized heat so that the doughy mass is heated higher than the vaporizing temperature of the solvent or solvents contained therein with the result that the mass expands and puffs up enormously after passing from the restricted area into free space or into the atmosphere. The solvents evaporate from the mass and leave it in a dry, brittle and porous condition. The treated mass herein termed friable intermediate pressed material, is reduced very easily to a pulverulent or powder form which is convenient and satisfactory for handling and for subsequent molding operations. Although, I have mentioned passing the doughy mass through a restricted area with the simultaneous application of heat, I may heat the mass before or after it reaches the restricted area to produce the friable intermediate material.

In the preparation of the primary doughy mass, an appropriate quantity of a cellulose derivative, such as nitro-cellulose, acetyl cellulose, alkyl cellulose or the like, is mixed with a suitable softening agent or plasticizer like camphor, castor oil, etc., and a solvent to form a viscous, doughy or pasty mass. This doughy or pasty mass is then caused to pass, preferably in a continuous manner, through a restricted area which is heated locally to a relatively low temperature. The temperature employed will, of course, vary according to the particular conditions and constitution of the mix under treatment but is preferably higher than the vaporizing temperature of the solvent contained in the doughy mass. As the heated mass issues from the restricted area there is a sudden evaporation of the solvent so that the mass swells and puffs up and expands enormously, and becomes a porous mass. In some cases the porous mass is about 20 to 50 times larger than the volume of the mass in the restricted area. Due to the fact that practically all of the solvent evaporates from the mass as it passes into free space the porous mass is practically completely dry and substantially devoid of solvent material. The porous mass is extremely brittle and very friable so that it crumbles into pieces very easily. After crumbling or disintegrating the mass, the pieces may be readily introduced into molds for the final pressing operation. A special advantage of this friable porous mass, hereinafter called friable intermediate material for pressed masses, is that it may be mixed with other refined or powdered substances in a dry condition, particularly with such substances which could not be admixed with the primary doughy mass because of deleterious effects caused by the solvents contained in the doughy mass. This is particularly the case with such substances as incompletely polymerized reaction products of formaldehyde, acetaldehyde, furfural, or the like, and phenols, amines, urea, albumines, etc.

In many instances it is desirable to modify the properties of the pressed mass and I do this by incorporating various modifying agents either in the raw primary materials or in the friable intermediate material so that the melting or softening point, the di-electric property, the hardness, or some other property, of the finished product is varied to adapt it to particular circumstances. I prefer to incorporate modifying agents in the pressed masses or articles by adding one reactive substance to the primary mass, and then adding to the intermediate material another substance capable of reacting with the first mentioned reactive substance during the final molding or pressing operation, especially under the influence of heat and/or pressure. Incomplete reaction products, for instance, second stage bakelite powder or the like may be mixed in the dough-like mass or in the friable intermediate material so that the product resulting from the final heat pressure operation will contain and will be practically surrounded by an insoluble tertiary bakelite product which is resistant to high temperatures and to high electrical stresses. In another example, for instance, by the employment of a suitable solvent in the primary mass, caoutchouc solutions may be added to solutions of cellulose derivatives constituting a part of the primary mass and the resultant mass can be treated in accordance with my invention and my improved friable intermediate material containing unvulcanized rubber can be obtained. By adding a suitable vulcanizing agent to the said friable material and then subjecting the material to a heat-pressure treatment a hard rubber-like product is formed. Of course, in addition to the foregoing, natural or artificial resins, dyestuffs, filling materials or the like may be added during any suitable step in the process. In the case of the filling material it may be added to the raw primary material and/or to the friable intermediate material, but it is preferable to mix it with the primary paste containing all of the solvents.

My improved process may be carried out in various types of apparatus but the most practical apparatus consists of a cylinder provided with a piston or internal feeding screw to carry the dough-like mass to the head of the apparatus. In the head an outlet of restricted area is incorporated so that the dough-like mass may be ejected from the apparatus in the form of slabs, filaments, rods or any other convenient body. Surrounding or in the outlet is a heating element which provides, preferably, localized heating for the material within the aforesaid restricted area. This heating element may have any appropriate construction such as a fluid heating jacket or an electrical heating device. By the employment of a heating arrangement of the aforesaid type it is possible to heat the doughy mass to any desired temperature just prior to the passage of the mass into free space, i. e. while passing through the restricted area. The doughy mass is preferably heated to a temperature higher than the boiling point of the solvent contained in the mass. For the usual solvents or solvent mixtures this temperature lies in a range extending from a region around 70° C. to a region around 100° C. When localized heat of the aforesaid degree is applied to the doughy mass as it passes through the restricted area, the solvents evaporate rapidly from the mass as it enters into free space beyond the restricted area. After the evaporation of the solvent the mass is puffed up and expanded into a highly porous state. In addition to the mass being puffed and porous, it is in a dry, brittle and very friable condition. This friable material readily pulverizes and crumbles so that it can be easily converted into a condition satisfactory for pressing of molded articles and the like. When localized heating is employed, as described hereinabove, it is unnecessary to use the high temperatures and high pressures and the cooling of the treated mass under high pressures required heretofore in the production of stone-like blocks of pressed mass material.

With the piston type of apparatus the dough-like mass within the cylinder is not mixed to any considerable extent but is merely moved forward towards the head of the machine. Various colored masses may be simultaneously fed into the aforesaid apparatus, and, due to the fact that there is only a slight mixing in the cylinder, filaments or the like constituted of multi-colored stripes may be ejected from the nozzles located in the head of the apparatus. If these filaments are then pressed in one mold various marble or stone effects may be obtained. In this manner I am able to produce a variety of products resembling marbles, porphyries, malachites, lapis lazuli, lazur stone, as well as other natural stones.

The friable intermediate material as described hereinabove may be made by another procedure which is a slight modification of the processes heretofore described. A doughy mass is made in a kneading machine, such as is used in the celluloid industry, by mixing and kneading a derivative of cellulose, a filling material, a plasticizer, and a solvent in appropriate proportions. The mass produced by this operation has the consistency of putty which is very plastic and workable. By feeding the aforesaid mass through rollers which are under pressure and are set to produce sheet material, the doughy mass is rolled out into a flat sheet. This sheet of plastic material still contains practically all of the plasticizers and solvents which were originally added to the primary mixture to make the plastic mass. After the sheet leaves the rollers it is subjected to heat to drive off all of the volatile solvents and to produce an expended, dry, and brittle sheet. The brittle sheet is disintegrated in some suitable way and the distintegrated product utilized for molding and making pressed articles. Instead of producing a doughy mass and then making friable intermediate material, I have found that I can take seconds, remnants and scraps of celluloid, cellulosic films, and similar material, and subject it to a drying process to drive off the remaining solvent and to embrittle the product. The dried material is disintegrated by the use of approved means, and is then ready to be molded or pressed. Of course, if the cellulosic seconds, remnants or scraps, etc. are old enough that they are so dried out and brittle as to be capable of disintegration, then the heating or drying operation may be dispensed with. The disintegrated product may then be molded or pressed under the application of heat and pressure.

The distintegrated or intermediate material produced in accordance with the aforesaid methods can be introduced into hot molds or into cold molds and then subjected to heat in the mold until the material just about reaches its softening point or its decomposition point, then pressure is applied. The hot softened mass within the mold under the action of pressure becomes entirely plastic and conforms to the shape of the mold. After the articles have been pressed, the mold is cooled from a temperature within a range from about 120° C. to about 180° C. down to about 60° C. while pressure is maintained on the mold until the temperature is reduced. The mold may then be opened and the finished article may be removed. It is to be noted that heat alone will not give any satisfactory results because the cellulosic masses only melt at high temperatures. At these high temperatures the masses decompose entirely, and even before these high temperatures are reached components of the masses are split off and evaporated. It is also to be observed that pressure alone will not affect the masses, and even enormous pressure merely pulps the mass together into a composite agglomerate which is non-homogeneous and non-usable. Only by heating the plastic masses to about their softening or decomposing temperature while in a confined chamber or space, and then applying moderate pressure and continued heating until the article is formed, can a successful homogeneous product be formed. When this last described procedure is followed, it is possible to heat the distintegrated masses without decomposing them. But the molds must be heavy in weight to absorb and retain sufficient heat to establish and maintain the proper temperature (from about 100° C. to about 200° C.) within the molds, and must be strong enough structurally to resist the pressures even though the latter are only moderate. Then again the molds have to withstand prolonged stresses because they are under pressure from the beginning of the operation until the mold is cooled down to about 60° C. and the operations are completed. The maintenance of pressure on the molds until the molds are relatively cold is important because if the molds are opened before being cool enough, the molded article expands and becomes deformed and covered at its exposed surface with knobs and irregular projections.

I have discovered, however, that it is not necessary to use the heretofore described process for producing molded articles, but great economies, increased production, and simplification of operations can be effected by die-casting cellulosic or other moldable non-metallic material. By utilizing my discovery, die-casting may be employed for the production of pressed masses of cellulosic material so that the articles are produced practically continuously without the necessity of heating a mold before use or cooling the mold under pressure to a temperature in the region of atmospheric temperature or a little above that temperature after molding the article or of using heavy, cumbersome and expensive steel molds. In carrying out the die casting process I first introduce a charge of intermediate material (e. g. my new friable intermediate material, acetyl or ethyl-cellulose remnants or scraps, or other moldable non-metallic material) into a pressure cylinder which is heated in any suitable manner, such as by electrical or gas heating, to a softening temperature. When the charge is in a softened state, moderate pressure is applied by means of a piston closing and sliding in the pressure cylinder. While the charge is in a semi-molten condition under pressure and heat, it may be extruded from an outlet or nozzle or a plurality of them located in the head of the pressure chamber. By placing a mold in communication with the extrusion outlet or nozzle (outlets or nozzles) the molten materials may be flowed under pressure directly into the hollow form within the mold to produce the desired article. The mold used for this purpose may be made light weight and only strong enough to hold its proper shape under operating conditions and the article produced, and may be used in a cold condition or even chilled by artificial cooling means, such as a water-jacketed supporting table. Consequently, molds made of cast iron, copper, brass, aluminum or the like may be employed for the casting or molding operation. When one mold is filled it may be quickly replaced by another, or the finished cast article may be ejected from the first mold immediately after casting, and the mold reused for further casting, as is the usual practice in die casting of metals.

When the molds are being removed and replaced, the pressure exerted by the piston is temporarily released but the softened charge is still maintained in a confined state. As the material is viscous and only flows when pressure is applied, no valves are needed to close the extruding outlet or nozzle. After the pressure chamber or cylinder is emptied the piston is withdrawn and a new charge of material is introduced into the chamber. The operations heretofore described are again repeated. In other words, the piston is pushed against the charge to confine it while heat is applied to the charge from the heated walls of the chamber. When the disintegrated material is softened, more pressure is applied and a homogeneous mass is extruded from the outlet into a mold which is held against the head of the chamber by movable mechanism. The mold is removed when the form is filled and is opened when the die cast article has set. By ejecting the article from the mold the latter is rendered available for further die casting operations. It is to be noted that by the use of the die casting process it is possible to produce a finished article in a small fraction of the time heretofore required by the known processes. Moreover, the employment of die casting is not limited to the use of my friable intermediate material or dried or disintegrated cellulose material but may be employed with other materials capable of being rendered plastic or semi-plastic or fluid by the application of heat and pressure, i. e. my process may be utilized for die casting moldable non-metallic substances.

The following specific examples are given as illustrations of my invention, the scope of which is not to be limited thereby but only by the appended claims.

Example No. 1

One hundred pounds of ethyl cellulose are mixed with twenty pounds of boiled castor oil and 200 pounds of talcum powder. The mixed mass is then moistened with 25 gallons of benzol and kneaded until a substantially homogeneous mass of material is formed. The homogeneous dough-like mass is introduced into a suitable apparatus, for example, into a cylinder containing a piston. By moving the piston forward under a slight pressure, the dough-like mass is forced and pushed toward the head of the cylinder containing the outlet nozzles or orifices of restricted area. The apparatus or parts of it and preferably only the head is heated to a temperature within a range extending from about 70° C. to about 120° C., and preferably about 90-100° C., so that the doughy mass becomes more fluid as soon as the mass comes into contact with hot nozzles. In this heated state the mass is extruded from the outlets in the head of the apparatus. As the threads, filaments, etc. of extruded material leave the outlet head the solvent contained in the material evaporates suddenly and almost instantly. Due to this quick evaporation of the solvent the solid material is blown and puffed into a great porous mass occupying a large volume. The porous mass constitutes my improved intermediate friable material which is very dry and which is disintegrated very easily. By filling a cylinder with disintegrated or intermediate material and then applying moderate pressures of say upwards of about 10 atmospheres and applying heat to the cylinder, a moldable material may be extruded from the head directly into a mold without the use of complicated valves and the like. The mold may not only be cool but may be cooled artificially by the use of cold air or a jacket through which cold water or brine is circulated. As the cold molds may be handled easily and as the time required by the casting of the article and the ejection thereof from the mold is very short, the mold may be used again instantly without any special heat treatment for the subsequent casting of more articles. In this manner it is possible to produce pressed masses while continuously maintaining and operating the final pressure cylinder in a heated condition and without the necessity of cooling the hot pressure cylinder after each pressing operation and subsequently re-heating the cylinder for the next pressing operation.

As soon as the charge contained in the hot cylinder is extruded, fresh charges can immediately be filled into the pressure apparatus. This filling and refilling can be repeated so quickly that the casting of articles can be carried on practically continuously. The aforesaid pressing operation only needs a press requiring a relatively low pressure, and even for pressing large articles only a hand apparatus is required.

The aforesaid process avoids the disadvantages of the known processes in which the very hard stone-like pressed mass has to be first produced by pressing raw primary material under high temperatures and pressures, and then mechanically disintegrating the stone-like mass into an intermediate material. As the preliminary pressing needs high pressures, only small quantities generally a few pounds, of pressed mass can be produced at one time. Moreover, the disintegrated mass had to be molded under heat and pressure in a mold which then had to be cooled under pressure to about atmospheric temperature before opening and ejecting the molded article. In other words, the mold has to be filled with disintegrated material, heated to a molding temperature, pressed under heavy pressure to mold the article, and then permitted to cool by itself while maintained under high pressure until cold.

Example No. 2

Nitro-cellulose scraps from factories producing celluloid articles (e. g. tooth brushes, combs, dolls, etc.) are exposed to air in order to remove as much as possible of the retained solvents. They are then mixed with mineral powders, such as lithopone zinc white and preferably with scraps of celluloid made of cellulose acetate and with plasticizers, stabilizers, such as urea, and/or fire retardants such as tri-phenyl phosphate so as to reduce the inflammability of the nitro-cellulose. The mixture is ground in a disk grinder, which has jackets incorporated in the disks so that the latter can be cooled with cooling water or brine passing through jackets. The disintegrated semi-plastic mass formed by this grinding process is put through an extruding cylinder which only contains a sufficient quantity of material to fill one mold, and, thereby, minimizes and practically eliminates danger in case of combustion. The extruding cylinder is heated by a steam jacket which surrounds the sides and especially the bottom. The hot mass is extruded into a mold which is preferably cold and maintained in a cold condition.

In contrast to the old process involving a series of complicated operations, my new process provides a simple sequence of operations which can be performed in but a small fraction of the time required with the old process. As an example of the rapidity with which my new process can be practiced, it may be noted that I can produce finished marketable products from raw materials (cellulose derivatives, solvents, plasticizers and filling materials) in about one hour. In carrying out the present invention it is possible to vary the composition, the characteristics, and the colors of the pressed mass in order to manufacture a great variety of articles. With my new process I am also able to make transparent hollow objects of various sorts.

It is to be observed that in carrying out my molding or die casting process it is not necessary to use my improved friable intermediate material as the plastic material for making the molded article. Any suitable moldable plastic non-metallic material or cellulosic plastic masses made by any gelatinizing or pressing or other process, such as material produced according to the U. S. Patent No. 1,510,779 issued to Richard Herrmann, or celluloid-like masses of acetate or alkylates of cellulose, or disintegrated remnants of such materials and of films or even nitrocellulose celluloid or film or other esters or ethers of cellulose may be used as the raw material in my processes for the manufacture of pressed, molded, or cast articles and products.

Although many different types and forms of apparatus may be employed for the practice of my process, I have invented several preferred types of apparatus. These apparatuses will be described in conjunction with the accompanying drawings, in which:—

Fig. 1 illustrates a longitudinal sectional view of an apparatus embodying my invention;

Fig. 2 is a view similar to Fig. 1 showing a modified embodiment;

Fig. 3 is a longitudinal sectional view of a die casting machine capable of carrying on my die casting process for pressed masses; and Fig. 4 is a fragmentary sectional view of a modified die casting machine.

Referring more particularly to Fig. 1, the reference character C designates a cylinder or chamber for doughy or putty-like cellulosic material which is to be treated by my improved process for the production of my friable intermediate material. The cylinder is mounted on a plurality of legs in any well-known manner and is provided with a closure head H at one end thereof and with an outlet head O at the other end. These heads have bearing supports S secured or preferably cast on their inner faces to carry the ends E of a conveyor K which fits in the interior I of cylinder C. One of the ends E, herein shown as the one at the closure head H, has an extension X projecting through a channel B in the closure head. On the exterior of the extension an appropriate driving means is mounted which is herein depicted as a pulley P.

In order to be able to feed a doughy mass of cellulosic material to the interior I of the cylinder, I provide an inlet chute D which communicates with and fits against an inlet nipple T preferably cast on the rearward portion of the cylinder. The doughy material is carried by the conveyor K towards the outlet head O which is provided preferably with a plurality of outlets or nozzles N having a relatively small cross section. Within the outlet head O a jacket U for a heating medium, such as steam, etc., is incorporated so as to make it possible to apply localized heat to the doughy mass as it passes through a restricted area within the nozzles. The heating medium may for example enter the jacket through an inlet pipe G and leave the jacket through an outlet pipe R.

The operation of my apparatus is obvious to one skilled in the art, and it is sufficient to state that the raw material consisting of a doughy mass (or its constituents) is fed into the interior of the cylinder via the inlet chute D. The conveyor K carries the mass forward to the outlet head O and forces it through restricted areas in the nozzles N which are subjected to localized heating. As the mass passes through the nozzles, it is heated by the heating medium flowing through the jacket, to a temperature preferably higher than the boiling temperature of the solvent or solvents contained in the mass so that after the mass emerges from the nozzles as a plurality of highly heated filaments or rods the solvents tend to evaporate from the filaments, etc. with great rapidity. Due to the quick evaporation of the solvents when the filaments pass into free space, the filaments are expanded and puffed up into a porous brittle mass.

A modified embodiment of my apparatus is illustrated in Fig. 2. It consists of a hollow cylinder C mounted on legs L and provided with a closure head H at one end, an outlet head O at the other end, and a feeding chute D secured to an inlet nipple T cast on the top of the cylinder near the rear end thereof. Within the cylinder a piston V is mounted which is actuated by a shaft W. This shaft W passes through channel B in the closure head and is adapted to be operated by a convenient prime mover or mechanism (not shown) in a well known manner.

When the piston is at the rear closure-head end of the cylinder, as shown, a gate valve Y is in a retracted or withdrawn position so as to establish a communication between the chute D and the interior I of the cylinder. The gate valve Y is operated by a rod Z and by any well known mechanism (not shown), as one skilled in the art will readily understand, which is operatively associated with the mechanism driving the shaft W. After a charge of raw material has been introduced into the cylinder and the piston is moved forward, the valve Y is closed and is kept closed until the piston passes the inlet nipple on its return stroke.

During the forward movement of the piston the raw material or doughy mass is carried or moved to the outlet head O which is provided with a plurality of nozzles N of relatively restricted areas. These nozzles are heated by a heating fluid or medium contained in a jacket U surrounding the said nozzles and incorporated in the outlet head O. The heating fluid enters the jacket through an inlet pipe G and leaves via an outlet pipe R.

The operation of the apparatus is obvious from the foregoing. Raw material is fed through chute D into the cylinder C when the piston is in a retracted position and the gate valve Y is open. When the piston is moved forward the raw material or doughy mass is carried toward the outlet head and then forced through the nozzles N. While the mass is going through the restricted areas in nozzles N it is subjected to localized heating by means of the heating medium contained in or flowing through jacket V. The mass is completely heated and emerges from the outlet head as a plurality of filaments, rods, etc. from which the solvent quickly evaporates, thereby expanding and puffing up the filaments, etc. into a porous and brittle state.

Another modified embodiment of my invention which is too simple to require illustration consists of heated rollers separated from each other by a restricted gap. The doughy mass is fed to the rollers by a suitable chute and is discharged from the rollers as a heated slab or sheet of material. This sheet or slab, like the filaments, rods, etc., is dry, porous and brittle due to the rapid evaporation of the solvents.

The embodiments of my invention have been herein illustrated and described as having heating means incorporated in the outlet head and associated with the outlets or nozzles. Although this is the preferred construction alternative means may be employed. For example, a heating jacket may surround a part or the whole of the cylinder, or the conveyer used in the apparatus illustrated in Fig. 1 may be hollow and have suitable connections so that a heating medium like steam may be passed through it and thereby heat the contents of the cylinder.

The structure illustrated in Fig. 3 depicts the upper portion of a die casting machine.

The numeral 1, designates the press cylinder which has a rounded interior and is adapted to contain the intermediate material from which pressed articles are to be made. Surrounding the press cylinder is a heating device 2, which is herein shown as an electrical heating element although a gas burner or other heating means may just as well be employed. In order to prevent a loss of heat the heating device is covered with insulating material 3. The cylinder with heating device and insulating material is secured to a cross-bar 4 which is mounted on and bolted to standards 5.

Seated within the cylinder is a piston 6 adapted to be moved up and down by a jack screw 7. This screw is mounted in a yoke 8 extending from cross-bar 4 and rotated by a hand wheel 9. By revolving the hand wheel the jack screw revolves, and the piston moves either up or down depending upon the direction of rotation of the wheel.

The intermediate material is introduced through an inlet port 10 located in the upper part of the press cylinder. When a charge of disintegrated cellulosic material has been introduced into the press cylinder the heat supplied by the electrical heating device raises the temperature of the material to its softening point and the piston confines it within the cylinder. After the entire charge is softened, the piston is progressively lowered in the cylinder, thereby placing the softened charge under pressure and extruding it from an outlet or nozzle 11 in the head 12 of the cylinder. Aligned with nozzle 11 is an inlet hole 13 of a mold 14 which is held by a movable platform 15 against the head 12. The hole 13 communicates with a hollow space 16 which is formed by the upper part 17 and the lower part 18 of mold 14, said hollow space having the shape of the article to be produced.

When die casting articles, the piston 6 is moved progressively downward until the hollow 16 in the mold 14 has been filled. The movement of the piston is then stopped or it may even be retracted slightly so that no softened material is extruded from the cylinder. After material has ceased to flow the movable platform 15 is quickly lowered by well-known mechanism operable by hand or foot. The mold is easily removed and is quickly replaced by another one as one skilled in the art will readily understand. By repeating the aforesaid operations the next article may be die cast with the extrudable and moldable cellulosic material. The cast articles may be taken from the molds or may be ejected therefrom in any well known manner.

In Fig. 4, I have depicted a fragmentary view of a modified die-casting machine. This machine has the same general construction as the one illustrated in Fig. 3 except for a modified head. The head 50 herein illustrated is constituted of a base portion 51 with nozzle 52 projecting therefrom. The end of nozzle 52 is provided with a taper 53 which fits against an inlet hold 54 of a casting mold. By making the nozzle of a heavy metallic construction and surrounding the nozzle with a heating device such as a gas burner 55, the outlet orifice 56 of the head as well as the bottom of the head may be maintained at a high temperature if desired. For example, in the case of using artificial resins of a very high melting point in a powdered or finely disintegrated form in the charge of material within the press cylinder, it is necessary to have a strong heat on the bottom of the cylinder and it is advisable to have the extruding orifice kept very hot. This can be done, as described above, by having a separate heating device around the orifice 56 incorporated in the nozzle extension 52. In this way it is possible to make castings containing resinous condensation products of the bakelite type by subjecting the material to the influence of heat and pressure while the said material is being extruded as liquid from the orifice into a cold mold which determines the final shape of the finished product. If the resinous condensation powder is mixed with the hereinabove described intermediate products of cellulose derivatives less heat is needed and more flexible moldings are obtained.

It is to be noted that the molds used in the die casting process are not under high pressure because shortly after the extruded mass comes into the cold mold it solidifies and sets and because the mold is not subjected to the high pressure existing within the press cylinder. For these reasons a light weight and inexpensive mold made from cast iron, copper, brass, aluminum, or the like, may be used.

Although certain specific compounds of cellulose have been named, it is to be understood that cellulose esters, ethers, alkylates, and other derivatives capable of being used for the herein described process, and extrudable and moldable materials derived from any other organic compound especially artificial resins of the bakelite type are to be included within the scope of the present invention.

Having described my invention, what I claim and desire to secure by Letters Patent is:

1. Molding apparatus for molding thermoplastic material comprising a die, a heating and extrusion cylinder in flow communication with the die, a plunger movable into the cylinder to force material from the cylinder into the die, means to heat the cylinder in order to fuse the material therein, and means to cool the open end of the cylinder to prevent back-flow around the plunger.

2. Molding apparatus for molding cellulose acetate comprising a die, a heating and extrusion cylinder in flow communication with the die, a plunger movable into the cylinder to force material from the cylinder into the die, means to heat the cylinder in order to fuse the material therein, means to feed solid cellulose acetate to the open end of the cylinder, and means to cool the open end of the cylinder to prevent back-flow around the plunger.

ARTHUR EICHENGRÜN.